(12) United States Patent
Trout et al.

(10) Patent No.: US 10,408,375 B2
(45) Date of Patent: Sep. 10, 2019

(54) BURIED PIPE LIFTING DEVICE AND METHOD

(71) Applicants: Michael A. Trout, Plant City, FL (US); Steven M. Trout, Geneva, IL (US)

(72) Inventors: Michael A. Trout, Plant City, FL (US); Steven M. Trout, Geneva, IL (US)

( * ) Notice: Subject to any disclaimer, the term of this patent is extended or adjusted under 35 U.S.C. 154(b) by 0 days.

(21) Appl. No.: 15/824,185

(22) Filed: Nov. 28, 2017

(65) Prior Publication Data
US 2019/0162353 A1    May 30, 2019

(51) Int. Cl.
| F16L 55/18 | (2006.01) |
| F16L 1/06 | (2006.01) |
| F16L 1/028 | (2006.01) |
| F16L 1/036 | (2006.01) |

(52) U.S. Cl.
CPC ............... *F16L 55/18* (2013.01); *F16L 1/028* (2013.01); *F16L 1/036* (2013.01); *F16L 1/06* (2013.01)

(58) Field of Classification Search
CPC ..... F16L 1/028; F16L 1/06; F16L 1/09; F16L 1/10; F16L 3/16; F16L 3/20; F16L 3/215; F16L 3/217; F16L 55/18
USPC ........................................................ 405/184.4
See application file for complete search history.

(56) References Cited

U.S. PATENT DOCUMENTS

| | | | | |
|---|---|---|---|---|
| 2,675,132 A * | 4/1954 | Susil | .................. | B66F 15/00 248/125.2 |
| 4,043,139 A * | 8/1977 | Scott | .................. | F16L 1/06 248/156 |
| 4,183,484 A * | 1/1980 | Mathews | ................. | F16L 3/222 211/189 |
| 4,218,044 A * | 8/1980 | Ikhsanov | ................. | F16L 55/18 254/93 R |
| 4,252,466 A * | 2/1981 | Berti | .................. | F16L 1/20 405/172 |
| 4,268,189 A * | 5/1981 | Good | .................. | F16L 1/06 138/105 |
| 4,397,590 A * | 8/1983 | Friesen | .................. | E02D 17/12 405/154.1 |
| 4,993,160 A * | 2/1991 | Fraley | .................. | G01C 15/02 33/286 |
| 5,242,247 A * | 9/1993 | Murphy | .................. | E02F 5/145 248/49 |
| 5,785,457 A * | 7/1998 | Thompson | .............. | F16L 1/201 248/72 |
| 5,971,664 A * | 10/1999 | Wilson | ...................... | F16L 1/06 248/49 |
| 6,250,847 B1 * | 6/2001 | Bingham, Jr. | ........ | F16L 3/1211 138/106 |
| 7,135,087 B2 | 11/2006 | Blackmore et al. | | |
| 7,845,881 B2 * | 12/2010 | Kline | ...................... | F16L 1/024 405/154.1 |

(Continued)

*Primary Examiner* — Frederick L Lagman
(74) *Attorney, Agent, or Firm* — Taylor IP, P.C.

(57) ABSTRACT

A method for in situ relocation of an underground utility including the steps of inserting, extending, raising and continuing to raise. The inserting step is carried out by the inserting of at least one lifting member down into the ground alongside the underground utility. The extending step extends a lifting bracket from the at least one lifting member. The raising step raises the lifting member causing the lifting bracket to engage a portion of the underground utility. The continuing step continues to raise the lifting member until the underground utility reaches a predetermined position.

19 Claims, 7 Drawing Sheets

(56) References Cited

U.S. PATENT DOCUMENTS

| | | | |
|---|---|---|---|
| 8,029,036 B2 * | 10/2011 | Kline | F16L 1/06 254/93 R |
| 8,439,604 B2 * | 5/2013 | Coleman | E21D 9/005 405/154.1 |

* cited by examiner

BURIED PIPE LIFTING DEVICE AND METHOD

BACKGROUND OF THE INVENTION

1. Field of the Invention

The present invention relates generally to the repair of underground utilities, and more particularly to equipment that is used to modify the positioning of underground pipe.

2. Description of the Related Art

It is generally known that sewer lines should be constructed with a minimum fall of ¼ inch per 1 foot of pipe. This allows wastewater to continue flowing via gravity through the pipe while minimizing any deposit of debris. When pipes have sags, or low spots in the pipe, also known as "belly", that don't meet this minimum fall, debris can settle into the low spots. Sags are typically a problem when they are severe enough to cause debris to settle in the pipe. The sag or belly is where the sewer pipe has lost a continuous slope on its way to its destination, and where the rate at which liquids travel through it is significantly reduced. The reduced velocity of liquids allows the belly area to collect solids, eventually obstructing the line, resulting in sewer backups.

Additionally, the Clean Water Act has mandated that ground water infiltration into our sewer systems be substantially reduced or eliminated. Many methods of repair of pipelines have been devised. Some of those repair methods include slip lining, pipe bursting, cured in place pipe lining (CIPP), fold and form thermoplastic lining, spot repairs, as well as the traditional dig and removal/replacement of pipelines.

The "in situ lining" repair of pipes has often been the most effective alternative to pipe "dig and replacement". An annular space or void adjacent to the outside surface of the pipe can be injected with a gelatinous grout material to eliminate water infiltration into the pipe. This repair is only temporary since the gelatinous material is not dimensionally stabile and often requires later replacement. The grout material is not capable of stabilizing the ground around the pipe even if the entire annular space is filled with the gelatinous grout. The lack of stability and support can result in additional stress on the pipe structure, with eventual degradation of the pipe and resulting water infiltration. This sort of in situ repair deals with leaks, but fails to address dips or sags in the pipeline.

Injection of expanding closed cell foams and cementitious grout has been used to level or reinforce pipe sections; however, there can be a migration of the foam or grout into the pipe joint that, if left in place, can cause an occlusion or blockage. When this migration into the interior diameter of the pipe does occur, a cutting or grinding device must be inserted as a subsequent step to remove the excess foam or grout.

Remedial repairs of infrastructures that have experienced differential settlement supported on soils often rely on helical piers and brackets in conjunction with excavation to support below grade utilities. However, these devices cannot lift a utility to an original elevation but rather immobilize the utility from further settlement. Often, these piers and brackets are installed in conjunction with newly installed utilities in weak soil environments to minimize the likelihood of future settlement.

Presently, there is no known mechanical device for the raising of below grade utilities which can be operated for the use of utility raising without excavation. Presently, one known methodology/process for raising below grade utilities is compaction grouting. Currently, the process for raising below grade utilities without excavation has been through the use of compaction grouting utilizing either cementitious grout or an expanding polyurethane foam. Cementitious grouting is primarily limited to exterior uses due to the nature of the work. Polyurethane grouting is considerably cleaner and a more expeditious process. However, with both techniques the amount of achievable lift is dependent upon soil type, age of the pipeline and the amount of settlement.

What is needed in the art is an in situ method of removing pipe sags and stabilize the position of the pipes, without the drawbacks discussed above, to enable utility lines to be raised with precision regardless of the soil type.

SUMMARY OF THE INVENTION

The present invention provides an underground utility grade restoration device and method.

The invention in one form is directed to a method for in situ relocation of an underground utility including the steps of inserting, extending, raising and continuing to raise. The inserting step is carried out by the inserting of at least one lifting member down into the ground alongside the underground utility. The extending step extends a lifting bracket from the at least one lifting member. The raising step raises the lifting member causing the lifting bracket to engage a portion of the underground utility. The continuing step continues to raise the lifting member until the underground utility reaches a predetermined position.

The invention in another form is directed to an underground utility in situ relocation mechanism including a beam, a lifting device coupled to the beam, the lifting device being positioned on a surface of the ground, and a plurality of lifting members for insertion down into the ground alongside the underground utility. The lifting members are coupled to the beam, each of the lifting members having a lifting bracket that is extensible from the respective lifting member. The lifting bracket engages a portion of the underground utility. The lifting device is configured to apply an upward force on the beam that withdraws the lifting members, to some extent, from the ground to thereby lift the underground utility to a predetermined position.

The invention in still another form is directed to an underground utility relocation system for use with a lifting device. The system includes at least one lifting member for insertion down into the ground alongside the underground utility. The lifting members are couplable to the lifting device. The lifting member has a lifting bracket that is extensible from the respective lifting member. The lifting bracket is capable of engaging a portion of the underground utility. The lifting device is configured to apply an upward force on the lifting member that withdraws the lifting member to some extent from the ground to thereby lift the underground utility to a predetermined position.

An advantage of the present invention is that the sag of an underground utility can be eliminated without excavating the utility.

Another advantage is that the present invention allows for a precise staged movement of the sections of the utility.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
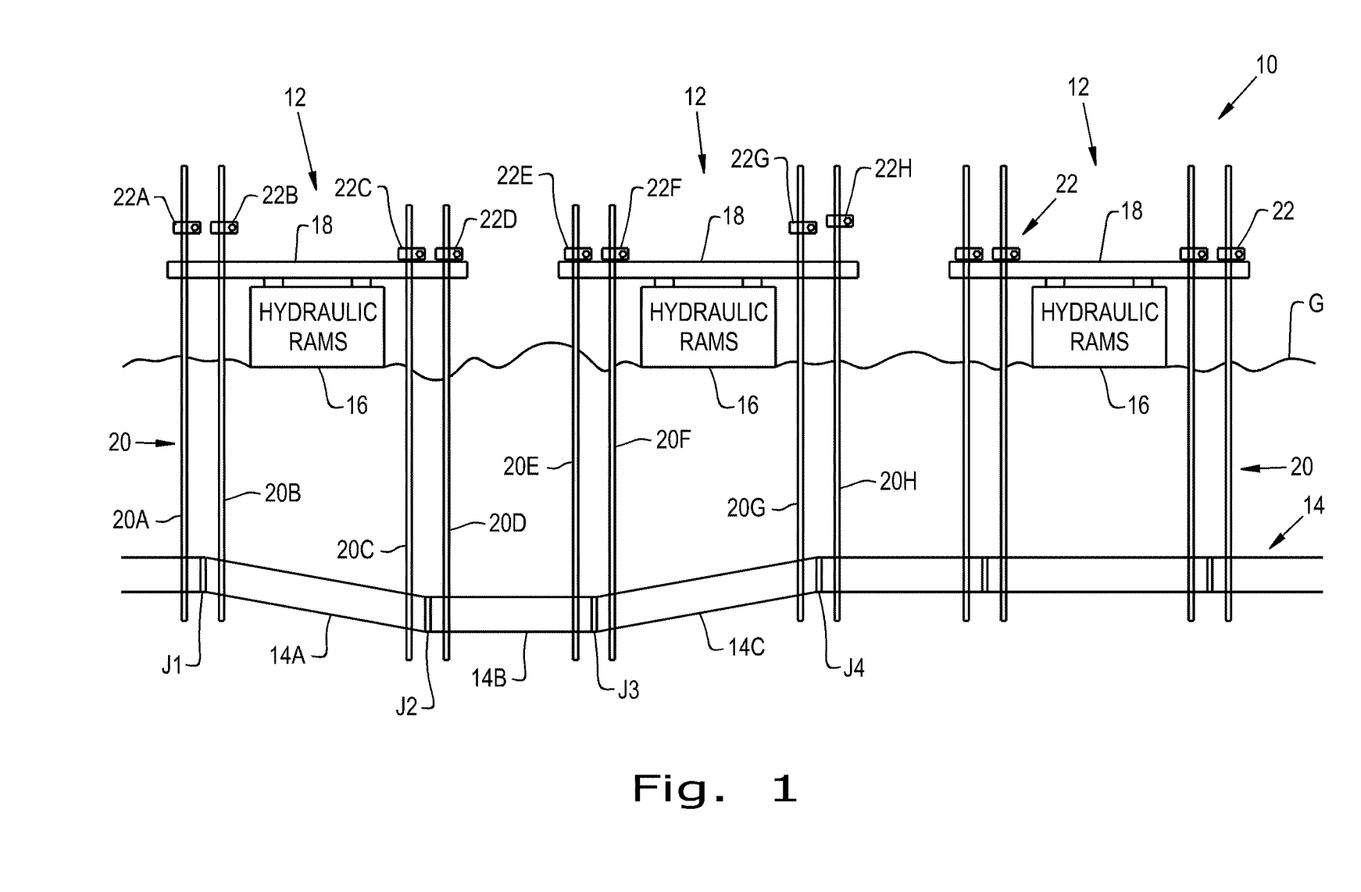
FIG. 1 is a schematical side view of an embodiment of three pipeline lifting devices of the present invention positioned to alter a sagged pipeline.

Referring now to the drawings, and more particularly to FIG. 1, there is shown a system 10 for the in situ relocation of a buried pipe 14. There are shown three underground utility in situ relocation mechanisms 12 each having hydraulic rams 16 also referred to as a lifting device 16, a beam 18, lifting members 20 and lifting collars 22.

Three pipe segments are identified as segments 14A, 14B, and 14C with joints J1, J2, J3 and J4 of the segments identifying where each segment 14A, 14B, and 14C is coupled to an adjacent pipe segment. Pipes 14 once installed sometimes develop sags or what is also referred to as a belly, which is illustrated by segments 14A, 14B, and 14C, in perhaps a somewhat exaggerated manner, to illustrate the problem that system 10 corrects.

A survey of the condition of pipe 14 may reveal the location of the sage of pipe segments 14A, 14B, and 14C as well as the locations of joints J1, J2, J3 and J4. Such a survey, perhaps with a sensor package inserted inside of pipe 14, assists in the positioning of lifting members 20 alongside of pipe 14 at the appropriate locations. Lifting members 20 are driven into the ground using conventional methods so that sections of pipe 14 can be engaged (discussed later) and lifted.

Here lifting members 20A and 20 B are positioned along pipe 14, with lifting member 20A being to the left of joint J1 and lifting member 20B being to the right of joint J1. In a like manner lifting members 20C, 20D, 20E, 20F, 20G and 20H are respectively arranged about joints J2, J3 and J4. Lifting members 20 are slidingly engaged with respective beams 18 with lifting collars 22 being clamped onto lifting members 20 so that the distance above beam 18 is selected to properly raise the respective pipe sections of pipe 14. Here lifting collars 22A and 22B are positioned above beam 18, while collars 22C and 22D are positioned on beam 18. In a similar fashion collars 22E and 22F are positioned on another beam 18 while collars 22G and 22H are located above beam 18. Note collar 22G is a bit closer to beam 18 than collar 22H. When lifting devices 16, which are positioned on ground G, in the form of hydraulic rams 16, are activated the lifting of pipe section 14B starts before the lifting starts at joints J1 and J4.

Figure 2:
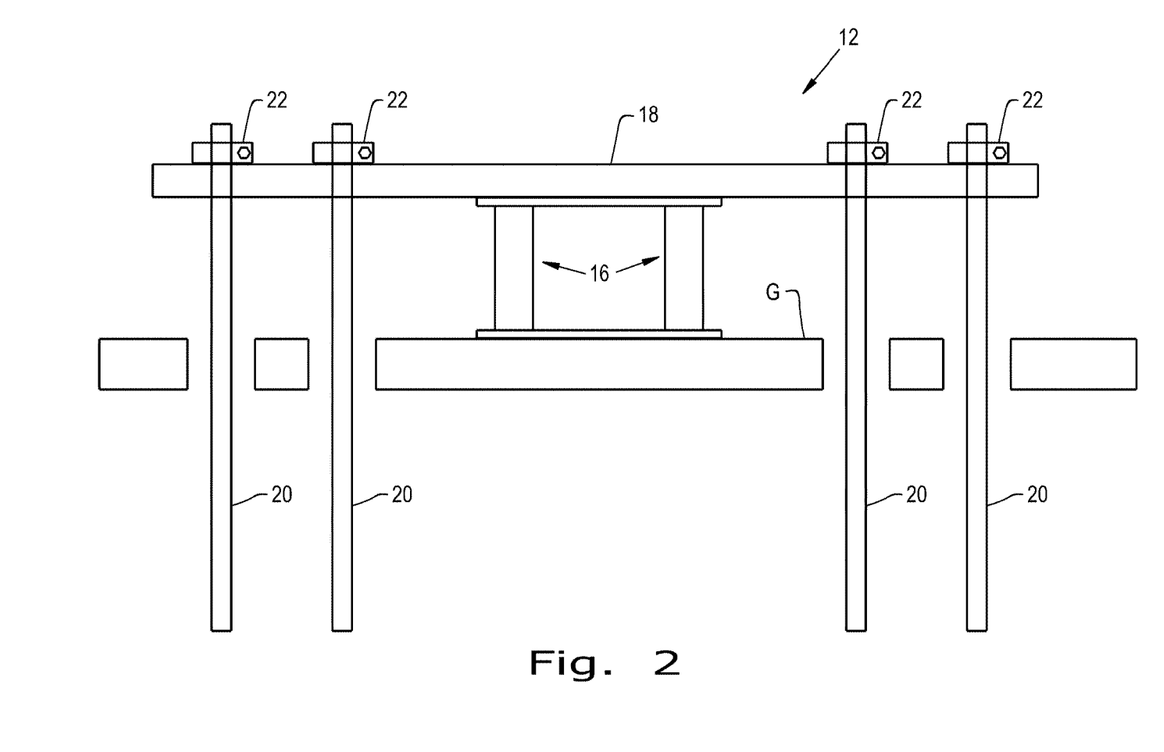
FIG. 2 is an enlarged schematical view of one of the lifting devices of FIG. 1.
Figure 3:
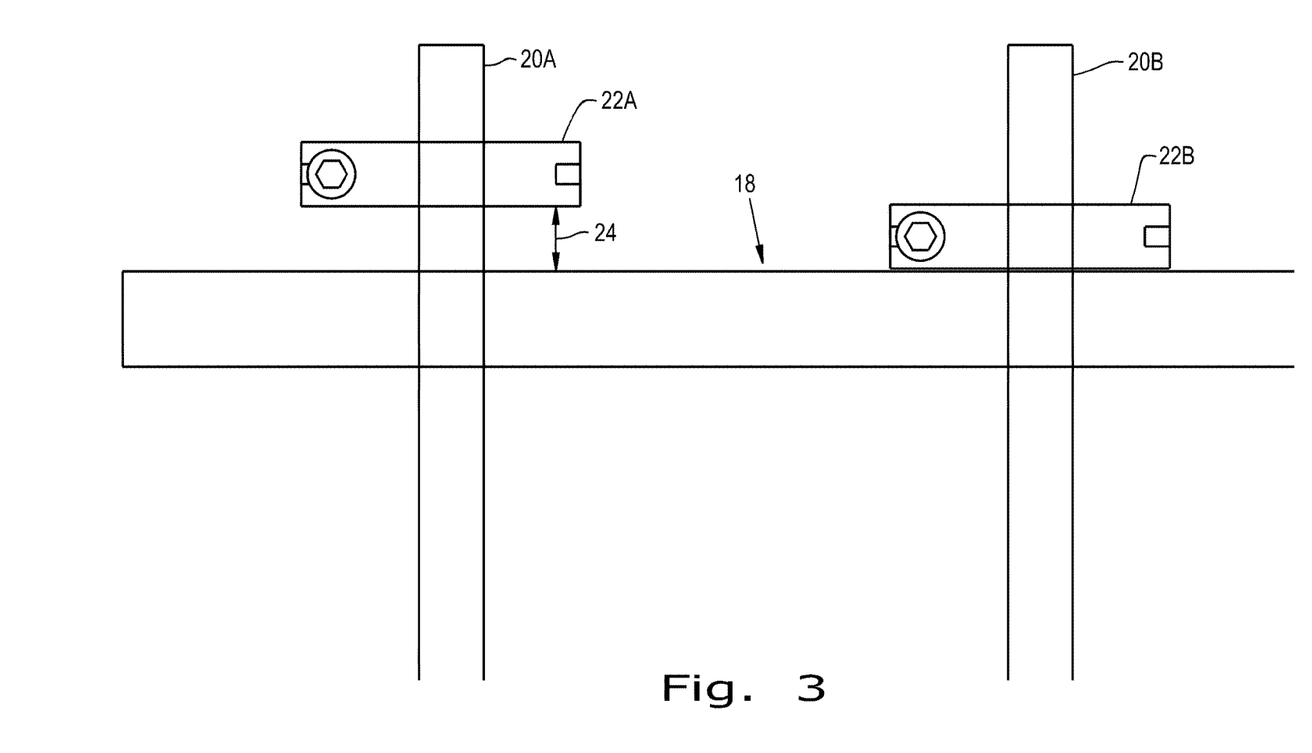
FIG. 3 is a further side view of a portion of a lifting device of FIGS. 1 and 2.

Now, additionally referring to FIGS. 2 and 3 there is shown a more schematizied view of a lifting mechanism 12, with hydraulic rams 16 supporting beam 18 as lifting members 20 are supported by beam 18. Collar 22A may be positioned a distance 24 above beam 18, so that lifting member 20B will start lifting pipe section 14A before lifting member 20A starts to lift. The positioning of collars 22 can be arranged with a laser system or other reference apparatus.

Figure 4:
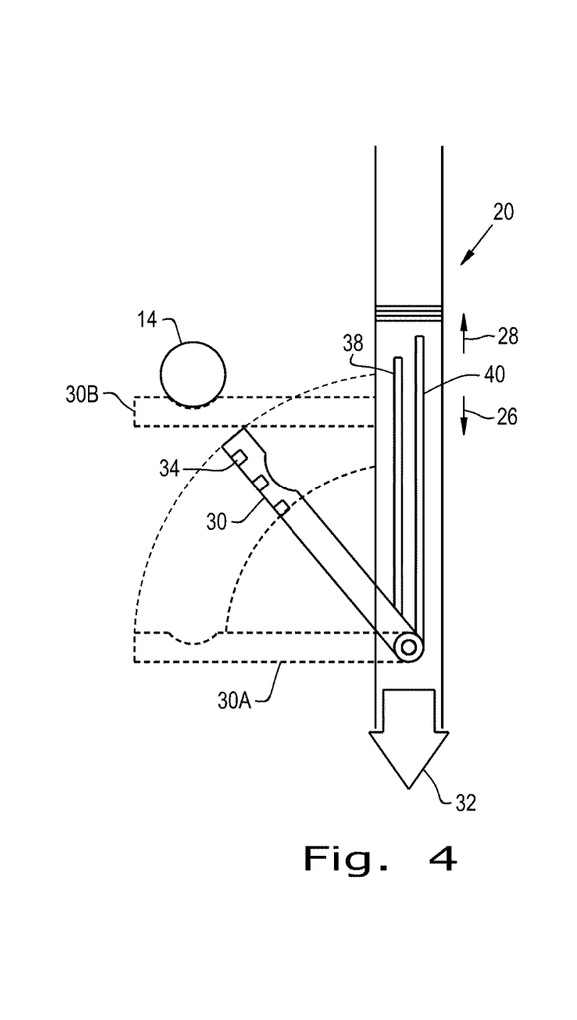
FIG. 4 is another detailed view of a portion of a lifting member of the lifting devices of FIGS. 1-3, showing the extension of a lifting bracket.
Figure 5:
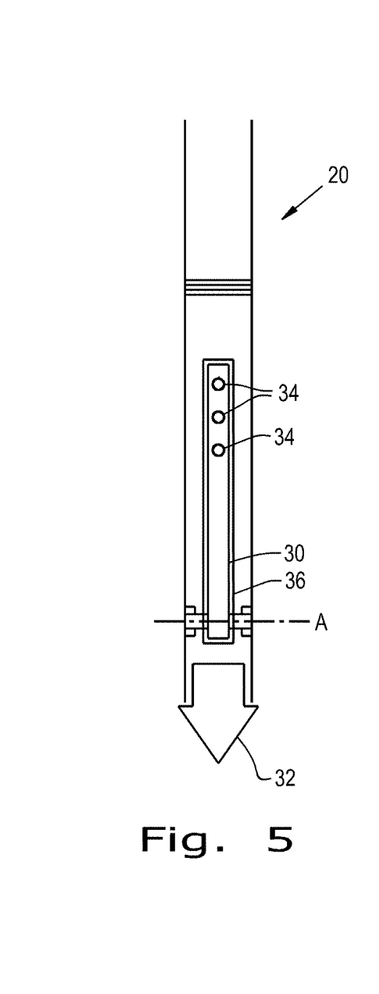
FIG. 5 is another view of the portion of the lifting member of FIG. 4, with the lifting bracket positioned within the lifting member.

Now, additionally referring to FIGS. 4 and 5 there are shown details of the lower end of lifting members 20 and how the system 10 engages pipe 14. A lifting bracket 30 is stowed within lifting member 20 as lifting member 20 is driven in direction 26 into ground G. A sacrificial point 32, with an oversized diameter is placed on the end of lifting member 20 as it is driven into the ground in direction 26, so that sacrificial point 32 provides a side clearance in the penetration of the soil for lifting member 20. As lifting member 20 is moved in direction 28 lifting member 20 disengages from sacrificial point 32.

Initially lifting member 20 is driven in direction 26 so that lifting member 20 is at a depth such that lifting bracket 30 can be deployed from within lifting member 20. A pivoting mechanism, not specifically shown, causes lifting bracket 30 to pivot about axis A in an outwardly direction. Liquid cutting jets 34 are positioned along a portion of lifting bracket 30 so that a high pressure liquid, such as water, can be sprayed out to remove or soften the soil adjacent to lifting member 20 as lifting bracket 30 is deployed. The excess liquid and moistened soil may be pumped up lifting member 20 to create a void as lifting bracket 30 moves to position 30A. Lifting bracket 30 exits from lifting member 20 through a slot 36 in a side of lifting member 20.

The high pressure liquid is supplied by way of a line 38 that is supplied from a source, not shown, at the top side of mechanism 12. Once lifting bracket 30 is deployed then lifting member 20 is moved in direction 28 so that lifting bracket 30 then is in the position illustrated at 30B, so that lifting member 20 engages pipe 14. Lifting of utility 14 continues as lifting members 20 are lifted by lifting devices 16. Once the lifting process of pipe 14 is completed, then a supporting foam, grout or other material is injected in the void beneath pipe 14 by way of a supply line 40 that may have nozzles along a portion of lifting member 20. Then in coordination with these supporting steps, lifting member is moved in direction 26 and lifting bracket 30 is pivoted about axis A back through slot 36 into lifting member 20 and then lifting member 20 is withdrawn from ground G.

Figure 6:
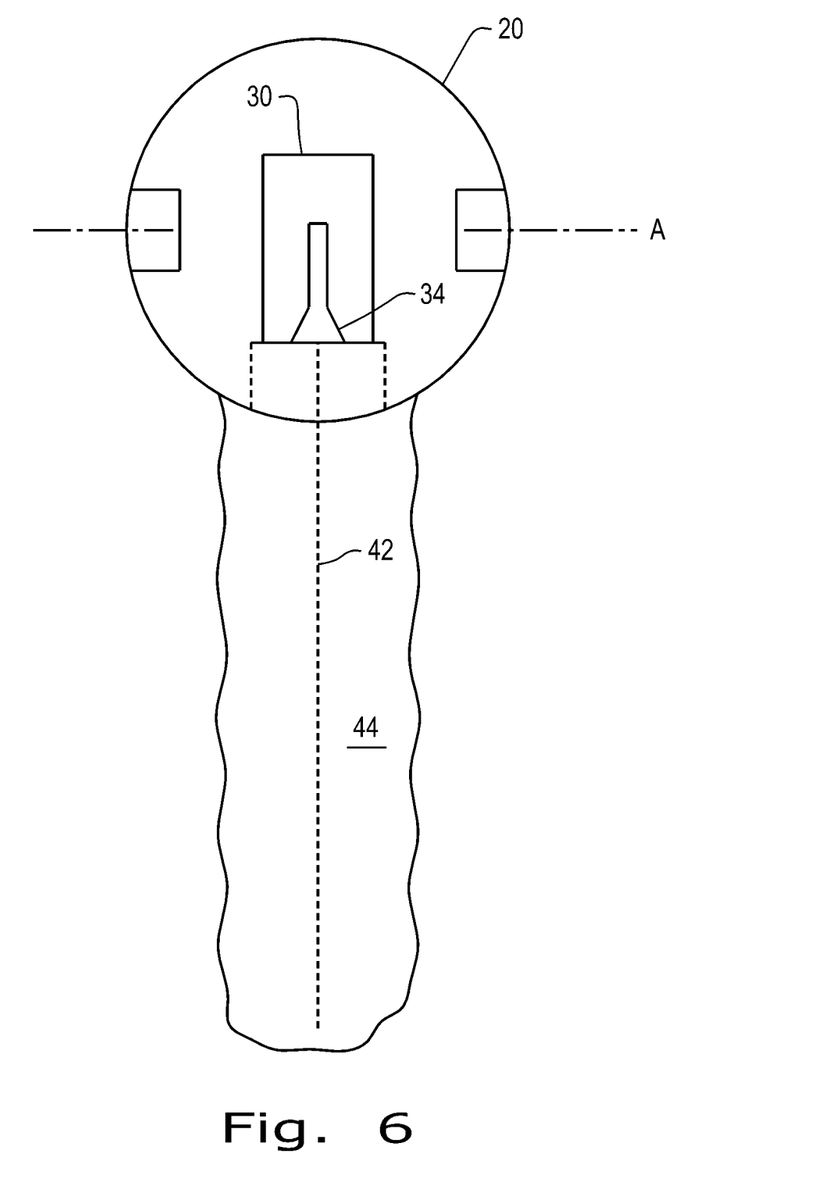
FIG. 6 is a schematical representation of a void created by the extension of the lifting bracket of FIG. 4.

Now, additionally referring to FIG. 6 there is shown a top down look at lifting bracket 30 that emits a stream 42 of high pressure liquid to form a void 44. Void 44 may be empty or consist of a liquid slurry through which lifting bracket 30 can pivot, about axis A outward into void 44. In a like manner lifting bracket 30 may be retracted back into lifting member 20 as it exits void 44. Material from supply line 40 is then injected into void 44, which can also be thought of as an extended void 44 beneath the lifted section of pipe 14.

Figure 7:
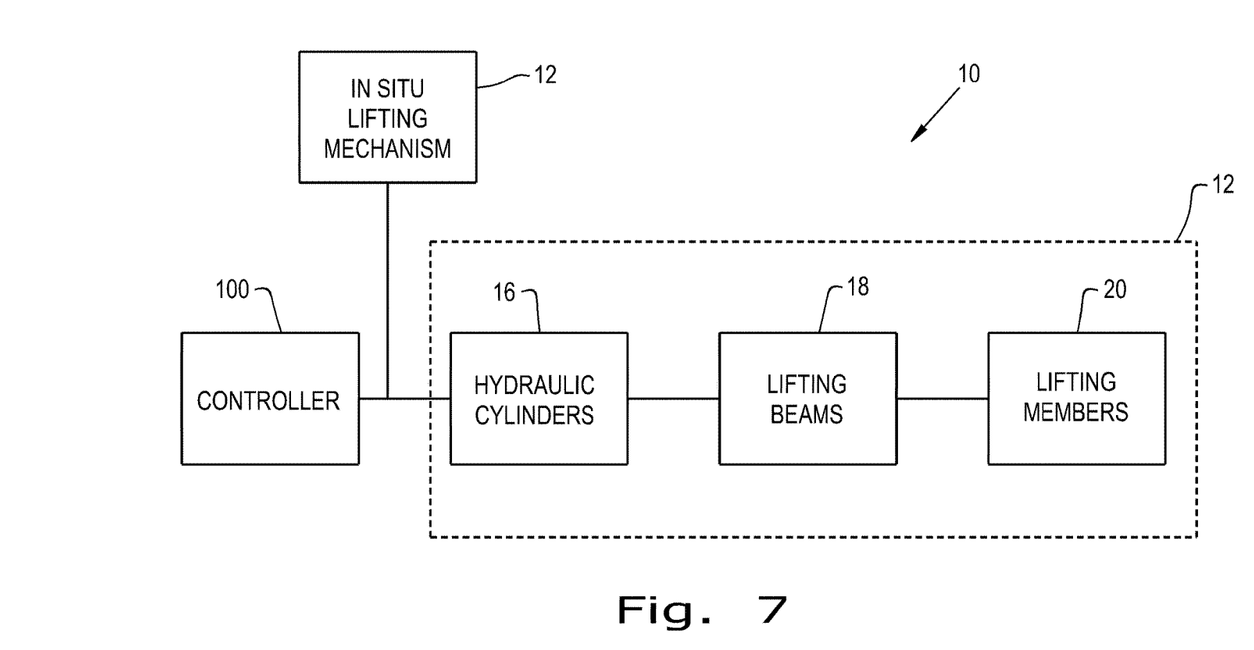
FIG. 7 is a schematical representation of a lifting system of the present invention.

Now, additionally referring to FIG. 7, there is illustrated more details of lifting system 10, which has a controller 100 coupled to multiple in situ lifting mechanisms 12. Controller 100 controls the deployment and retraction of lifting brackets 30, as well as the lifting sequence of lifting members 20 and the extent to which pipe 14 is lifted by lifting devices 16. It is contemplated that some of the movement of lifting members 20 in direction 26 can be effected with lifting devices 16 and the weight associated therewith.

Figure 8:
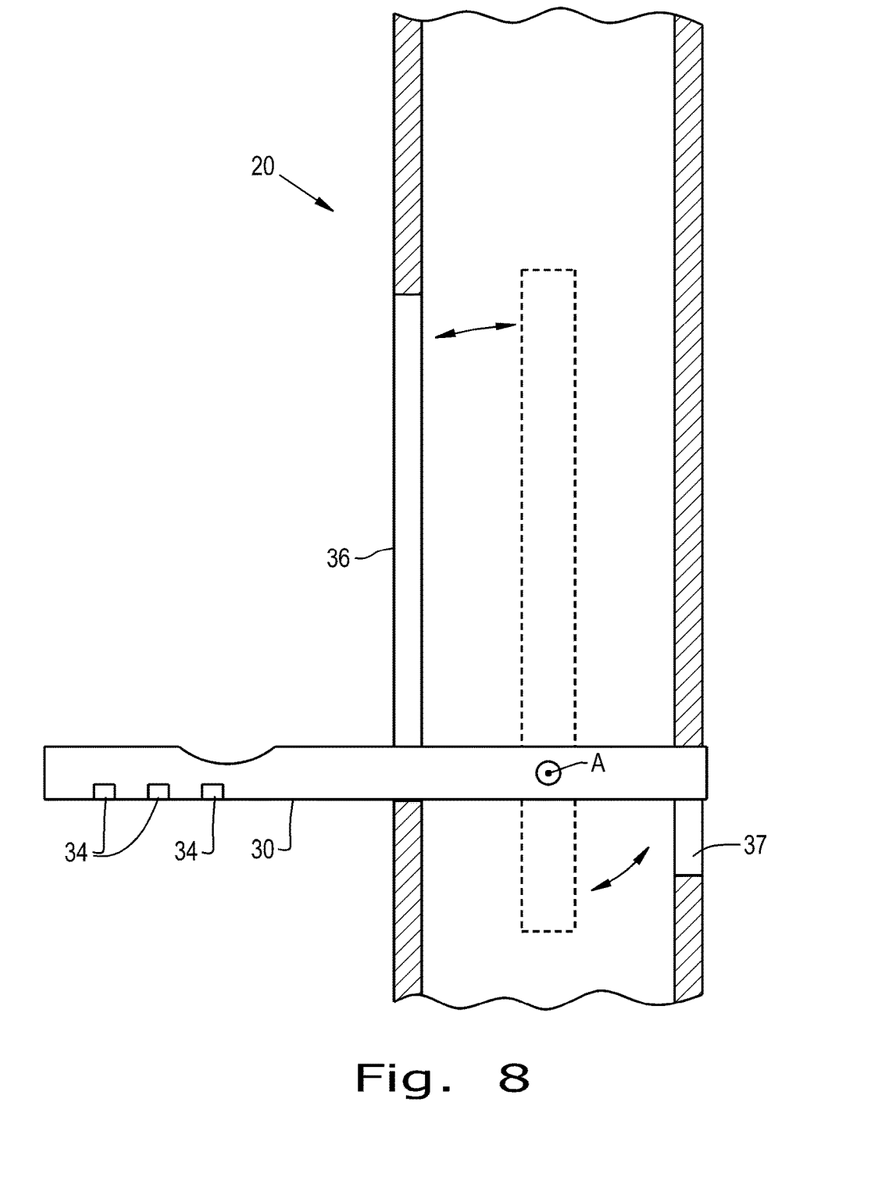
FIG. 8 is another embodiment of a lifting bracket of the present invention.

Now, additionally referring to FIG. 8 there is shown a cross sectional view of a portion of lifting member 20. Lifting bracket 30 is deployed through slot 36 and an extended back portion of lifting bracket 30 may exit through a slot 37 so that lifting bracket 30 is supported by both sides of the shell of lifting member 20. It is also contemplated that rather than having a slot 37, a protrusion can extend inward from the inside wall so that a portion of lifting bracket 30 can come into contact with it to also support lifting bracket 30.

The present invention is carried out using a method for in situ relocation of an underground utility 14 including the steps of inserting, extending, raising and continuing to raise. The inserting step is carried out by the inserting of at least one lifting member 20 down into the ground G alongside the underground utility 14. The extending step extends lifting bracket 30 from lifting member 20. The raising step raises the lifting member 20 causing the lifting bracket 30 to engage a portion of the underground utility 14. The continuing step continues to raise the lifting member 20 until the underground utility 14 reaches a predetermined position.

The method further includes the step of inserting material beneath the underground utility 14 thereby supporting the underground utility 14 at the predetermined position. The material flows through the lifting member 20 and/or lifting bracket 30. The method further includes a step of hydro-excavating soil proximate to lifting bracket 30 at least one of prior to and during the execution of the extending step to create void 44. The hydro-excavating step includes emitting water from at least one jet 34 on lifting bracket 30. The extending step includes pivoting of lifting bracket 30 from lifting member 20 as the emitting step takes place. During the extending step a pivoting step takes place in which lifting bracket 30 is pivoted from lifting member 20.

The present invention is an innovative technique that addresses the remedial repair of below grade infrastructures 14 that have experienced differential settlement due to soil loss or consolidation of supporting soils. The device 12 is installed adjacent to the utility line 14 followed by the extension of a lateral cradling bracket 30, which is then elevated to lift the utility line 14 to a higher elevation.

A steel pipe or casing 20 is driven to a predetermined depth adjacent to the buried utility 14, allowing for the deployment of the lifting bracket 30 beneath the utility 14. The lifting bracket 30 is completely housed within the interior of the casing diameter 20, enabling the casing 20 to be driven next to the utility 14.

An articulating steel bracket 30, recessed within the casing 20, is either manually or hydraulically extended. Top of the bracket 30 has a saddle for the utility 14 to rest in, thus minimizing point loading. Hydro jets 34 are recessed in the bottom of the bracket 30 to help weaken soils and aid in the extension of the bracket 30. If necessary, the jets 34 are activated during the extension of bracket 30, dependent upon type of soil and density. By weakening the soils, the jets 34 also assist in creating void 44 for the placement of grout therein.

Depending on the diameter of the utility 14, settlement and length of repair, a single or multiple lifting members 20, each having a lifting bracket 30, may be installed and employed in unison (as shown in FIG. 1) to achieve a desired lift or stabilization.

Once the brackets 30 are in place, hydraulic rams 16 are utilized to raise the casing 20 and attached lifting bracket 30 to the utility 14 underside and continue until the desired lift has been achieved. Upon successful raising of utility 14, the casing 20 is lowered, and the bracket 30 is retracted within the casing 20. The rams 16 are reactivated, and the casing 20 is extracted from the ground G.

At grade, a single or unison of clamps 22 are attached to the casings 20. Clamp locations can be adjusted at varying elevations for allowance of more progressive lifts. Where headroom allows, a lifting beam 18 and harness can be used in place of a series of hydraulic rams associated with each lifting member 20.

It is contemplated that the interior of the lifting member 20 and components therein may be affixed or inserted from grade.

The development of the present invention has resulted in devices 12 to lift below grade utilities 14 and infrastructure for the purposes of supporting and lifting the utilities 14 to a desired elevation and to restore a uniform flow of any drainage if pipe 14 is a drain line. The elements of the present invention are used to accomplish utility, infrastructure and below grade structure lifting and immobilizing without correctional excavation. The device cuts soils from pre-determined locations, at elevations below the surface ground. The device can contact and cradle the below grade utility 14 for the purposes of remediation, elevation and immobilization.

The manufactured cavities 44 allow the lifting bracket arm 30 to be extended without restriction to an elevation directly below the item 14 to be raised.

Some of the benefits and advantages of the present invention include that an interior mechanical device 30 is contained within a small diameter, installation in extremely close proximity to the item 14 to be lifted is accomplished. Also the extending lifting bracket 30 is capable of cradling a utility 14 in numerous locations with incrementally accurate lifts, which minimizes stress to the utility 14 and allows for precision realignment of the utility 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for in situ relocation of an underground utility, comprising the steps of
   inserting at least one lifting member down into the ground alongside an unexcavated buried underground utility;
   extending a lifting bracket from the at least one lifting member;
   raising the lifting member causing the lifting bracket to engage a portion of the buried underground utility; and
   continuing to raise the lifting member until the buried underground utility reaches a predetermined position.

2. The method of claim 1, further comprising the step of inserting material beneath the buried underground utility thereby supporting the underground utility at the predetermined position.

3. The method of claim 2, wherein the material flows through at least one of the lifting member and the lifting bracket.

4. The method of claim 1, further comprising a step of hydro-excavating soil proximate to the lifting bracket at least one of prior to and during the execution of the extending step.

5. The method of claim 4, wherein the hydro-excavating step includes emitting water from at least one jet on the lifting bracket.

6. The method of claim 5, wherein the extending step includes a step of pivoting the lifting bracket from the lifting member as the emitting step takes place.

7. The method of claim 1, wherein the extending step includes a step of pivoting the lifting bracket from the lifting member.

8. The method of claim 1, wherein the at least one lifting member includes a first lifting member and a second lifting member, the inserting step includes inserting the first lifting member proximate to the underground utility on one side of a joint in the underground utility and inserting the second lifting member proximate to the underground utility on an other side of the joint such that the raising and continuing steps take place on both sides of the joint.

9. An underground utility in situ relocation mechanism, comprising
a beam;
a lifting device coupled to the beam, the lifting device being positioned on a surface of the ground; and
a plurality of lifting members for insertion down into the ground alongside an unexcavated buried underground utility, the lifting members being coupled to the beam, each of the lifting members having a lifting bracket that is extensible from the respective lifting member, the lifting bracket engaging a portion of the buried underground utility, the lifting device being configured to apply an upward force on the beam that withdraws the lifting members to some extent from the ground to thereby lift the buried underground utility to a predetermined position.

10. The underground utility in situ relocation mechanism of claim 9, wherein at least one of the lifting members include a conduit line that delivers material beneath the buried underground utility thereby supporting the underground utility at the predetermined position.

11. The underground utility in situ relocation mechanism of claim 10, wherein the material flows at least part way along the lifting bracket.

12. The underground utility in situ relocation mechanism of claim 9, wherein at least one of the lifting member and the lifting bracket have at least one water emitting jet that is configured to hydro-excavate soil proximate to the lifting bracket prior to and/or during the extending of the lifting bracket from the lifting member.

13. The underground utility in situ relocation mechanism of claim 12, wherein the lifting bracket extends from the lifting member by pivoting therefrom.

14. The underground utility in situ relocation mechanism of claim 9, wherein the at least one lifting member includes a first lifting member, a second lifting member, a third lifting member and a fourth lifting member, with the first lifting member being inserted into the ground proximate to the underground utility on one side of a first joint in the underground utility and the second lifting member being inserted into the ground proximate to the underground utility on an other side of the first joint, the third lifting member being inserted into the ground proximate to the underground utility on one side of a second joint in the underground utility and the fourth lifting member being inserted into the ground proximate to the underground utility on an other side of the second joint, the first lifting member, the second lifting member, the third lifting member and the fourth lifting member each being coupled to the beam such that the lifting of the beam by the lifting device causes a utility segment between the first joint and the second joint to be lifted to the predetermined position.

15. An underground utility relocation system for use with a lifting device, the system comprising at least one lifting member for insertion down into the ground alongside an unexcavated buried underground utility, the lifting members being couplable to the lifting device, the lifting member having a lifting bracket that is extensible from the respective lifting member, the lifting bracket being capable of engaging a portion of the buried underground utility, the lifting device being configured to apply an upward force on the lifting member that withdraws the lifting member to some extent from the ground to thereby lift the buried underground utility to a predetermined position.

16. The underground utility relocation system of claim 15, wherein the lifting member includes a conduit line that is configured to deliver material beneath the buried underground utility thereby supporting the underground utility at the predetermined position.

17. The underground utility relocation system of claim 16, wherein the material flows at least part way along the lifting bracket.

18. The underground utility relocation system of claim 15, wherein at least one of the lifting member and the lifting bracket have at least one water emitting jet that is configured to hydro-excavate soil proximate to the lifting bracket prior to and/or during the extending of the lifting bracket from the lifting member.

19. The underground utility relocation system of claim 18, wherein the lifting bracket extends from the lifting member by pivoting therefrom.

* * * * *